(12) United States Patent
Matsuzaki

(10) Patent No.: US 8,979,206 B2
(45) Date of Patent: Mar. 17, 2015

(54) SEAT BACK FRAME

(71) Applicant: Toyota Boshoku Kabushiki Kaisha, Aichi-ken (JP)

(72) Inventor: Kazuyuki Matsuzaki, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 1 day.

(21) Appl. No.: 13/896,438

(22) Filed: May 17, 2013

(65) Prior Publication Data

US 2013/0341991 A1    Dec. 26, 2013

(30) Foreign Application Priority Data

Jun. 22, 2012   (JP) ................................. 2012-140301

(51) Int. Cl.
*A47C 7/02*   (2006.01)
*B60N 2/68*   (2006.01)
*B60N 2/02*   (2006.01)

(52) U.S. Cl.
CPC ...... *B60N 2/68* (2013.01); *B60N 2/682* (2013.01); *B60N 2002/0288* (2013.01)
USPC ............ 297/452.33; 297/452.23; 297/452.18; 297/248; 297/233

(58) Field of Classification Search
USPC .......... 297/340, 452.33, 452.19, 452.23, 233, 297/248, 452.18
See application file for complete search history.

(56) References Cited

U.S. PATENT DOCUMENTS

| | | | | |
|---|---|---|---|---|
| 5,716,100 | A * | 2/1998 | Lang ........................ | 297/378.12 |
| 6,739,673 | B2 * | 5/2004 | Gupta et al. ............. | 297/452.65 |
| 7,079,300 | B1 * | 7/2006 | Govyadinov et al. ......... | 359/288 |
| 7,377,586 | B2 * | 5/2008 | Evans .......................... | 297/248 |
| 7,971,939 | B2 * | 7/2011 | Fujita et al. .............. | 297/452.56 |
| 8,020,932 | B2 * | 9/2011 | Yamada et al. ............... | 297/257 |
| 8,308,238 | B2 * | 11/2012 | Imaoka ......................... | 297/236 |

FOREIGN PATENT DOCUMENTS

JP     2008-194289     8/2008

* cited by examiner

*Primary Examiner* — Chi Q Nguyen
(74) *Attorney, Agent, or Firm* — Greenblum & Bernstein, P.L.C.

(57) ABSTRACT

Embodiments of the present invention may include a seat back frame of a vehicle seat. The vehicle seat has a seat back main body configured to support the back of an occupant and an extension portion extending from a side of the seat back main body. The seat back frame has a main body frame, an extension frame, and a connection member. The main body frame may form a framework of the seat back main body and may be mounted on a base. The extension frame may form a framework of the extension portion. The connection member connects the extension frame to a side of the main body frame. The connection member has a rear support portion and a front support portion. The rear support portion contacts the main body frame and the extension frame from the rear so that the rear support portion integrally couples the main body frame and the extension frame. The front support portion contacts with the main body frame and the extension frame from the front so that the front support portion can couple the main body frame and the extension frame.

8 Claims, 4 Drawing Sheets

SEAT BACK FRAME

This application claims priority to Japanese patent application serial number 2012-140301, the contents of which are incorporated herein by reference.

BACKGROUND OF THE INVENTION

1. Field of the Invention

Embodiments of the present invention relate to a seat back frame of a vehicle seat.

2. Description of the Related Art

The vehicle seat has a seat back. A seat back described in Japanese Laid-Open Patent Publication 2008-194289 has a seat back main body adapted to support a back of an occupant, and an extension portion extending from a side of the seat back main body. The seat back main body has a main body frame having high structural strength and it's preferably fixed onto a floor. The extension portion has an extension frame supported on the side of the main body frame in a cantilever-like manner. The extension frame and the main body frame each have a circular pipe, and the extension frame and the main body frame are connected to each other by a connection structure. The connection structure has a steel bracket that connects the circular pipes. The bracket extends behind the circular pipes to contact rear sides of the circular pipes. While the connection structure may be resistant to forces approaching the extension portion from the front, it is vulnerable to forces approaching from the rear.

Therefore, there is a need in the art for a seat back frame that has an extension portion with high structural strength.

SUMMARY OF THE INVENTION

According to an aspect of the invention, certain embodiments of the present invention include a seat back frame of a vehicle seat. The vehicle seat has a seat back main body configured to support a back of an occupant and an extension portion extending from a side of the seat back main body. The seat back frame has a main body frame, an extension frame, and a connection member. The main body frame may form a framework for the seat back main body and may be mounted on a base. The extension frame may form a framework of the extension portion. The connection member connects the extension frame to a side of the main body frame. The seat back frame further has a rear support portion and a front support portion. The rear support portion contacts the main body frame and the extension frame from the rear so that the rear support portion integrally couples the main body frame with the extension frame. The front support portion contacts the main body frame and the extension frame from the front so that the front support portion integrally couples the main body frame to the extension frame.

Thus, the extension frame is supported and connected from both the front and rear sides with respect to the main body frame. Thereby, the seat back frame can have a connection structure that is resistant to forces coming from both the front and the rear. The strength of the extension portion can be increased by the connection structure.

In another aspect of the invention, the rear and front support portions may be provided at different heights. In this configuration, a bent portion or a protrusion portion extending in a front-back direction may be used for the rear and front support portions so that they won't interfere with each other. Thus, it is possible to reduce the thickness in the front-back direction of the seat back frame.

In another aspect of the invention the rear support portion may be configured so as to connect an upper portion of the main body frame and an upper portion of the extension frame. The front support portion may be configured so as to connect an intermediate portion of the main body frame and an intermediate portion of the extension frame. Force coming from the front side of the seat may be transferred to the extension portion. This force may then be substantially transferred at a location from the front support portion to the seat back main body. This location of transfer may be lower than the position of a rear support portion. In this way, the structural strength of the extension portion can be effectively increased.

DETAILED DESCRIPTION OF THE INVENTION

Each of the additional features and teachings disclosed above and below may be utilized separately or in conjunction with other features and teachings to provide improved seat back frames. Representative examples of the present invention, which utilize many of these additional features and teachings both separately and in conjunction with one another, will now be described in detail with reference to the attached drawings. This detailed description is merely intended to teach a person of ordinary skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful configurations of the present teachings.

Figure 1:
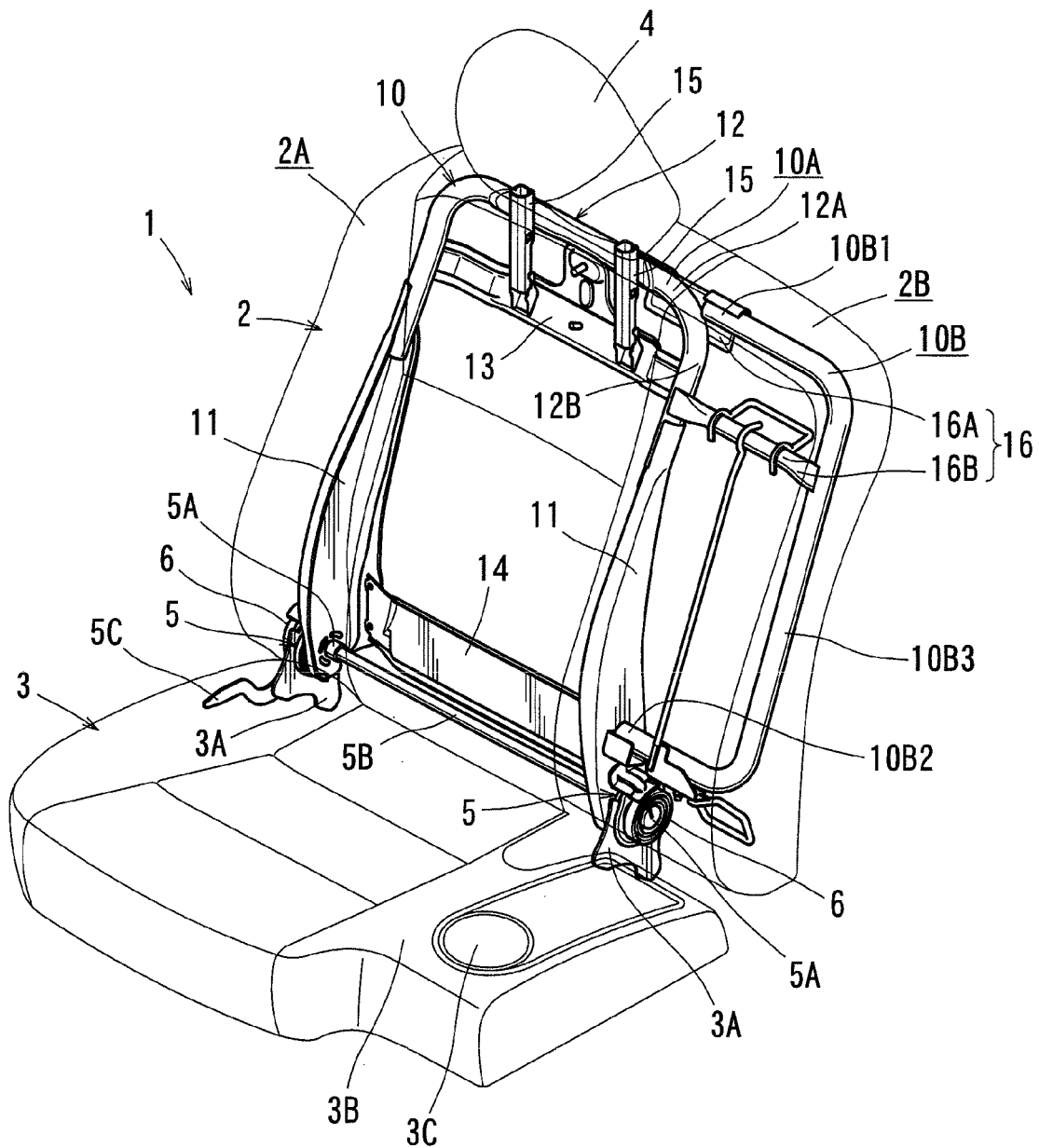
FIG. 1 is a perspective view of a seat with a seat back frame of one aspect of the present invention.

A vehicle seat 1 shown in FIG. 1 is a driver's seat of a vehicle. The vehicle seat 1 has a seat back 2 that supports a back of an occupant sitting on the vehicle seat 1, a seat cushion 3 on which the occupant sits, and a headrest 4 that supports a head of the occupant. The seat back 2 has a seat back frame 10.

The seat back 2 has a seat back main body 2A that supports the back of the occupant, and an extension portion 2B that extends to the inside of the vehicle (a right side as shown in FIG. 1) from the seat back main body 2A. The extension portion 2B extends laterally from the seat back main body 2A. The extension portion 2B preferably has a surface located on the same plane as a surface of the seat back main body 2A, and a back surface located on the same plane as a back surface of the seat back main body 2A. The extension portion 2B preferably has the same side shape as a side shape of the seat back main body 2A. That is to say, the shape of a projection side of the extension portion 2B may be substantially the same as the shape of a projection side of the seat back main body 2A. A seat back of a passenger seat (not shown) is located near the lateral side of the seat back main body 2A. The extension portion 2B is able to connect the seat back main body 2A and the seat back of the passenger seat.

The seat back main body 2A and the seat cushion 3 may be connected to each other by a disk-shaped reclining device 5. The reclining device 5 is a rotary shaft device that can connect the two members such that they can rotate and/or be arranged in a fixed manner. The reclining device 5 connects the lower end portions of both the left and right sides of the seat back main body 2A and the rear end portions of both the left and right sides of the seat cushion 3. The reclining device 5 connects the lower end portions of both side frames 11 of the seat back main body 2A and the rear end portions of both side frames 3A of the seat cushion 3. Thereby, a backrest angle of the seat back 2 relative to the seat cushion 3 can be adjusted.

Each of the reclining devices 5 is usually maintained in a locked state whereby they fix the backrest angle of the seat back 2. A release lever 5C is provided on an outer side (a left side in a show direction) of the seat cushion 3. When the release lever 5C is pulled up, the reclining device 5 is unlocked. The reclining device 5 has an operation shaft 5A inserted into the center thereof. The operation shafts 5A of a pair of reclining devices 5 are connected by a connecting rod 5B and can be rotated. When the release lever 5C is pulled up, the operation shaft 5A located on an outer side is rotated in the release operation direction. The operation shaft 5A of the inner side is also rotated in the release operation direction at the same time. In this way, both of the reclining devices 5 can be unlocked at the same time.

Each of the reclining devices 5 switches from a locked state to an unlocked state whereby the backrest angle of the seat back 2 can be freely changed in the front-back direction. After changing the backrest angle of the seat back 2 to a predetermined angle, the operation of the release lever 5C can be stopped. Thereby, each of the reclining devices 5 returns to the locked state again, and the backrest angle of the seat back 2 is fixed at the predetermined angle. The reclining device 5 can have the same configuration as that disclosed in the document of Japanese Laid-Open Patent Publication 2011-116303 or the like.

Between the left and right portions of the seat back 2 and the left and right portions of the seat cushion 3, a spiral spring 6 is provided which typically biases the seat back 2 forward. When the fixation of the backrest angle of the seat back 2 is released, the seat back 2 rotates whereby it may come into contact with the back of the occupant via the biasing force of the spiral spring 6. When the back of the occupant is tilted forwards or backwards, the backrest angle of the seat back 2 is changed in accordance with the tilting of the back. In this way, the backrest angle of the seat back 2 can be easily adjusted.

The seat cushion 3 may be provided on a floor of a vehicle using left and right slide devices (not shown). The position of the seat cushion 3 can be adjusted with respect to the floor in the front-back direction. The slide device can have, for example, a structure disclosed in the document of Japanese Laid-Open Patent Publication 2010-221935 or the like. The seat back 2 may have an extension portion 2B. The seat cushion 3 may have an extension portion 3B extending the seat width direction in accordance with the extension portion 2B. On the upper surface of the extension portion 3B, a recessed cup holder 3C may be formed in which a drink or a small object can be placed.

The headrest 4 is typically mounted above the seat back 2. The headrest 4 preferably has two rod-like stays (not shown) protruding downward from the headrest main body. The seat back frame 10 of the seat back 2 has an upper frame 12. The two square tube-shaped holders 15 may be fixed to the upper frame 12. A support member may be mounted inside each of the holders 15. The stays may be inserted into the support members, and the headrest 4 may be fixed to the upper portion of the seat back 2. The mounting structure, which mounts the headrest 4 to the seat back 2, can have a structure, for example, disclosed in Japanese Laid-Open Patent Publication 2008-239075.

Figure 2:
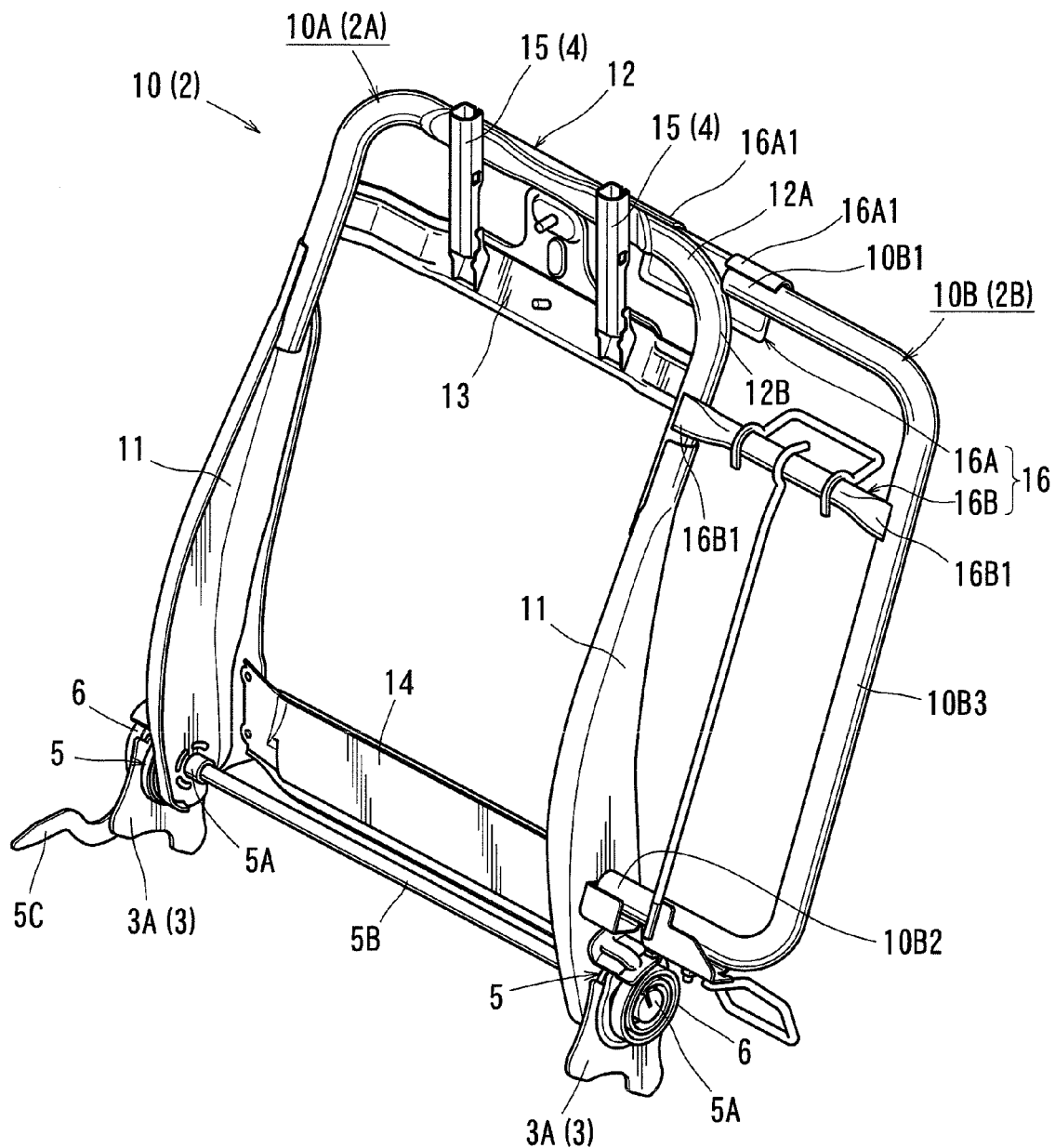
FIG. 2 is a perspective view of the seat back frame.

As shown in FIGS. 1 and 2, the seat back frame 10 has a main body frame 10A, an extension frame 10B, and a connection member 16. The main body frame 10A forms a a framework of the seat back main body 2A. The extension frame 10B forms a framework of the extension portion 2B. The connection member 16 connects the extension frame 10B to the main body frame 10A.

The main body frame 10A has side frames 11, upper frame 12, holders 15, an upper reinforcement plate 13, and a lower reinforcement plate 14. The components are integrally assembled. The side frame 11 has a pair of vertical left and right plates. The upper frame 12 is an inverse U-shaped pipe that connects the upper end portions of the side frames 11. The holder 15 has a square tube shape, and is provided on the left and right portions of the upper frame 12. The upper reinforcement plate 13 has a horizontal plate between the left and right leg portions of the upper frame 12. The lower reinforcement plate 14 has a horizontal plate between the lower portions of the side frames 11.

When manufacturing the side frame 11, a steel plate material is cut in a vertically long shape using a press. Next, the front and rear edge portions of the steel plate material are bent to the inside of the seat in a flange shape. Each of the bent edge portions is able to increase strength resistant to bending or distortion of the side frame 11. Each of the edge portions suppresses the protrusion of the side frame 11 to the outside (the front and the rear or the outside of the seat). The side frame 11 is located on the side of the seat back main body 2A, and forms the framework of both of left and right sides of the seat back main body 2A. Both of the side frames 11 have the surfaces facing each other in the seat width direction.

When manufacturing the upper frame 12, a circular steel pipe is typically cut to a predetermined length using a press. Next, the circular steel pipe material is bent in an inverse U shape. The upper frame 12 has left and right leg portions extending downward, and both of the leg portions are welded to the upper end portion of each of the side frames 11. In this way, the upper frame 12 can be coupled to the side frame 11.

The upper end portion of the side frame 11 is bent in a semi-cylindrical shape so that the shape thereof is matched with the outer circumferential surface of each leg portion of the upper frame 12. Thereby, each leg portion of the upper frame 12 can contact with each upper end portion of each side frame 11 in a wide area. They are typically can be welded in a wide area and coupled to each other.

The holder 15 is manufactured by cutting a squared-off steel pipe to a predetermined length. The holder 15 extends vertically. The upper portion of the holder 15 is connected to a front surface of a central portion extending in the seat width direction of the upper frame 12. The lower portion of the holder 15 is connected to a front surface of the upper reinforcement plate 13 by the welding. The holder 15 can support the headrest 4 (see FIG. 1) due to its high structural strength. It uses the upper frame 12 and the upper reinforcement plate 13 for support.

When manufacturing the upper reinforcement plate 13, a sheet of steel material is cut using a press. Next, the upper and lower edge portions of the steel material are bent to the front of the seat in a flange shape. The upper and lower bent edge portions can increase strength resistance to bending or distortion. The upper and lower edge portions can suppress the angulation of the upper reinforcement plate 13 to the outside (the rear side of the seat). The left and right end portions of the upper reinforcement plate 13 are welded to the rear surfaces of each leg portion of the upper frame 12. In this way, the upper reinforcement plate 13 can be fixed and integrally coupled to both leg portions of the upper frame 12. Each end portion of the upper reinforcement plate 13 is bent in a semi-cylindrical shape that is matched with the outer circumferential surface of the leg portions of the upper frame 12. Thereby, each end portion of the upper reinforcement plate 13 can contact each leg portion of the upper frame 12. They are preferably welded and coupled to each other.

In manufacturing the lower reinforcement plate 14, a sheet of steel is cut using a press. Next, the upper and lower edge portions of the steel plate material are bent to the front of the seat in a flange shape. The upper and lower edge portions can increase strength resistant to bending or distortion of the lower reinforcement plate 14. The upper and lower edge portions can suppress the angulation of the lower reinforcement plate 14 to the outside (the rear side of the seat). The left and right end portions of the lower reinforcement plate 14 are welded to a front surface of the rear edge portion bend to the inside of the seat of the lower portion of the side frame 11. Thereby, the lower reinforcement plate 14 can be coupled to the lower portions of the side frames 11.

When manufacturing the extension frame 10B, in the same manner as the upper frame 12, a steel pipe is cut to a predetermined length. Next, the steel pipe is bent in a U shape in the transverse direction. The extension frame 10B is placed so that the U-shaped opening faces the main body frame 10A. The upper end portion 10B1 of the extension frame 10B is coupled to a shoulder portion of the upper frame 12 of the main body frame 10A by a rear support member (portion) 16A of the connection member 16. A lower end portion 10B2 penetrates and is fitted to the side frame 11 of the main body frame 10A, and is coupled to the side frame 11 by welding.

The extension frame 10B has an intermediate portion 10B3 extending vertically and downward from the upper end portion 10B1 to the lower end portion 10B2. The intermediate portion 10B3 is coupled to a leg portion (a portion 12B) of the upper frame 12 of the main body frame 10A by a front support member (portion) 16B of the connection member 16. One side of the extension frame 10B is coupled to the main body frame 10A, and the extension frame 10B is supported by the main body frame 10A. The extension frame 10B is at least partially provided within the main body frame 10A, and extends from the main body frame 10A in the lateral direction.

The lower end portion 10B2 of the extension frame 10B is fitted to a circular hole formed in the side frame 11 in the seat width direction, and is welded to the side frame 11. For that reason, the extension frame 10B can be coupled to the main body frame 10A in a simple configuration. However, the upper end portion 10B1 of the extension frame 10B is coupled to the upper frame 12, without being fitted to the through hole of the upper frame 12. For that reason, the extension frame 10B is not coupled to the main body frame 10A in a simple configuration. The upper end portion 10B1 of the extension frame 10B is coupled to the shoulder portion of the upper frame 12 formed by bending of the circular steel pipe. They are preferably connected via the connection member 16. The connection member 16 fixedly and integrally couples the extension frame 10B with the upper frame 12 through a relatively simple configuration, without lowering the structural strength of the main body frame 10A.

Figure 3:
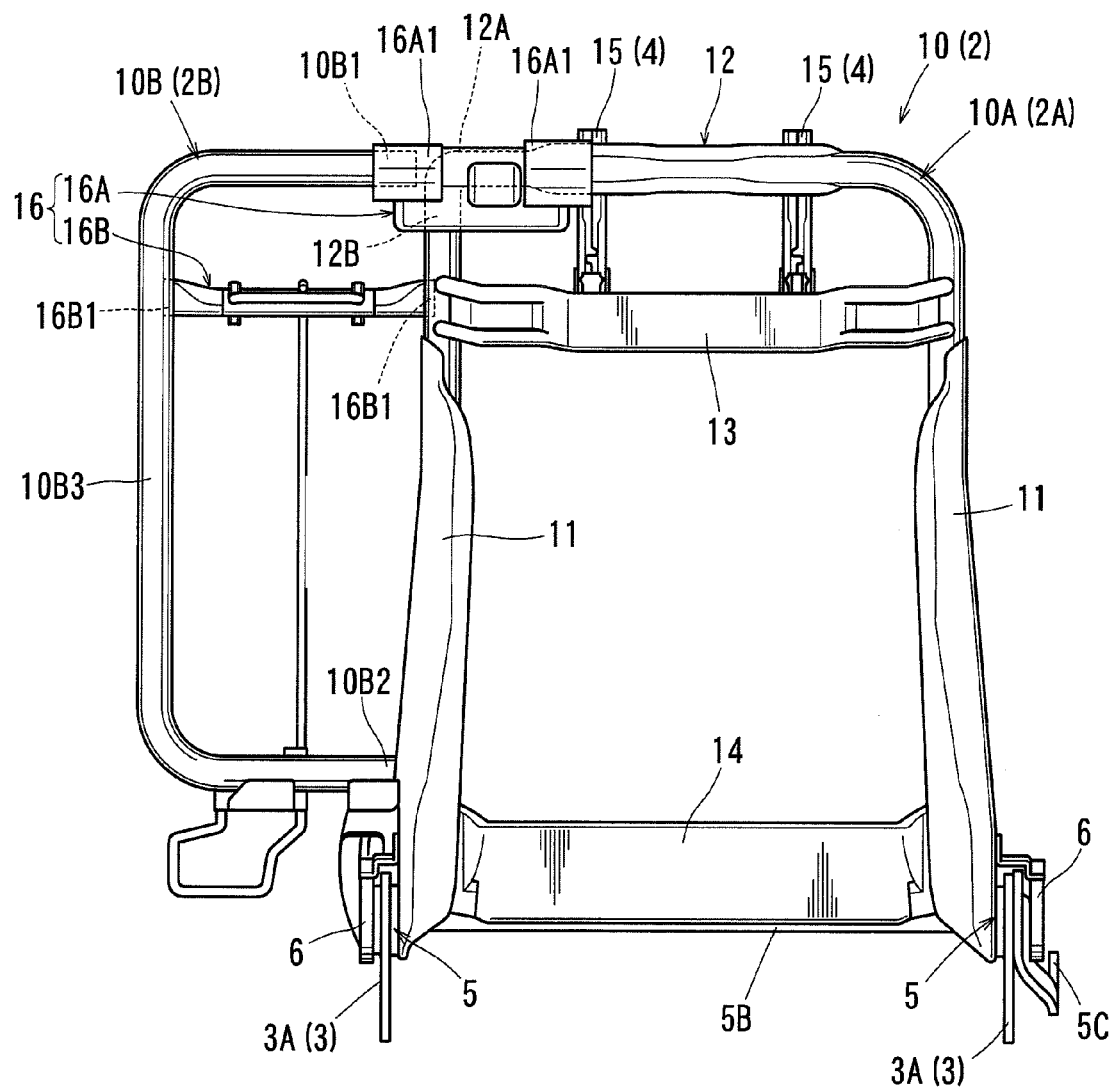
FIG. 3 is a rear view of the seat back frame.
Figure 4:
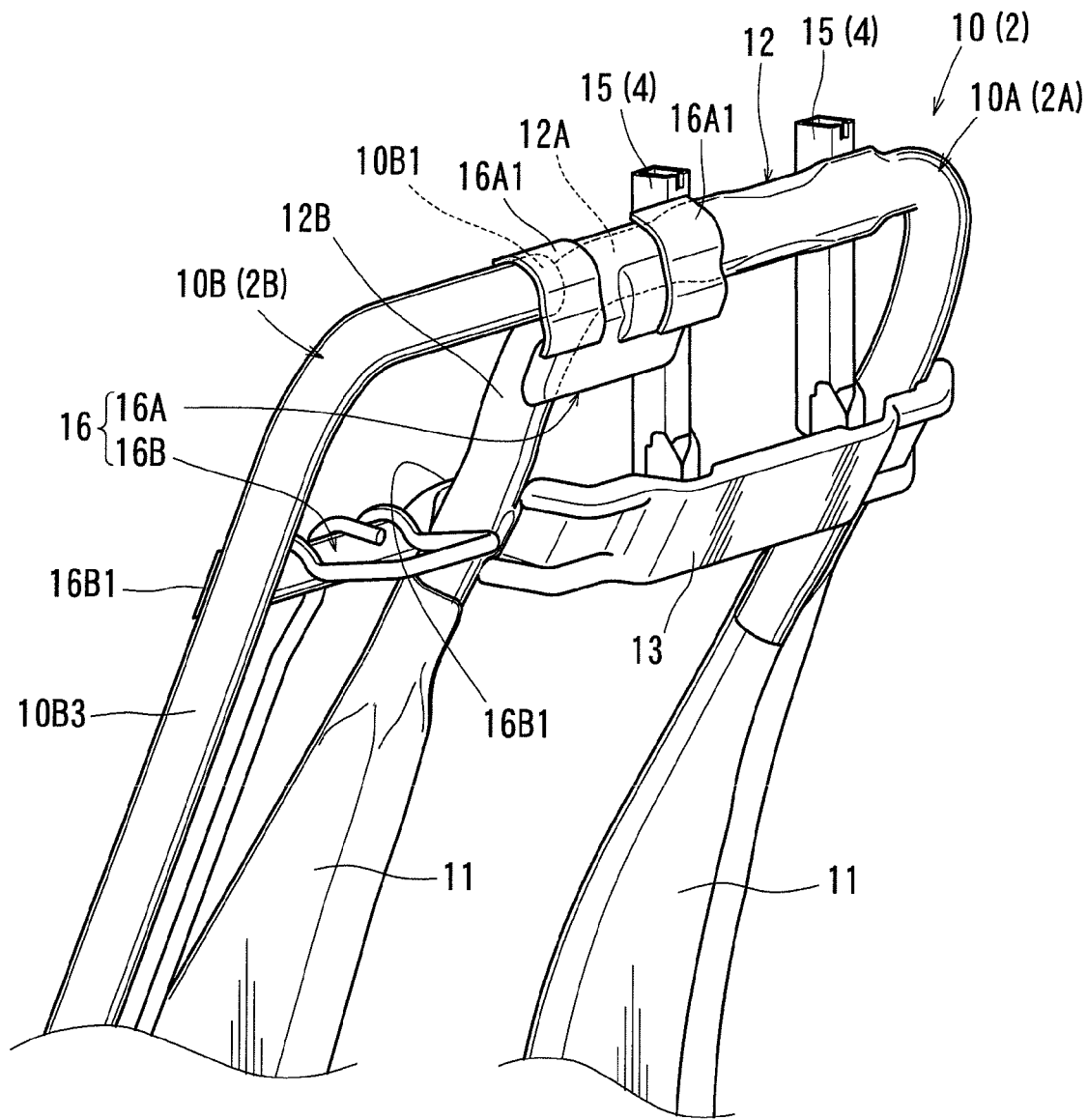
FIG. 4 is an enlarged perspective view of a main portion of the seat back frame shown from behind.

As shown in FIGS. 2 to 4, the connection member 16 has a rear support member 16A and a front support member 16B. The rear support member 16A is a flat plate-shaped steel plate material. The rear support member 16A is coupled to the rear surface of the upper end portion 10B1 of the extension frame 10B and the rear surface of the shoulder portion of the upper frame 12. The front support member 16B is a circular steel pipe material. The front support member 16B is coupled to the front surface of the intermediate portion 10B3 of the extension frame 10B and the front surface of the leg portion (the portion 12B) of the upper frame 12. In this way, the rear support member 16A and the front support member 16B couple the extension frame 10B to the upper frame 12.

As shown in FIGS. 3 and 4, the rear support member 16A is coupled with the rear surface of the upper end portion 10B1 of the extension frame 10B and the rear surface of the first portion 12A and the rear surface of the second portion 12B of the upper frame 12. The rear support member 16A is coupled to each of three back surfaces through welding. The upper end portion 10B1 of the extension frame 10B extends in the seat width direction. The first portion 12A extends in the seat width direction of the shoulder portion of the upper frame 12. The second portion 12B is bent and extends downward from the first portion 12A.

The rear support member 16A is coupled to the rear surface of the second portion 12B, and thus the rotation about the first portion 12A is restricted. The rear support member 16A is coupled to the rear surface of the upper end portion 10B1 and the rear surface of the first portion 12A. In this way, the rotation about the second portion 12B is restricted. The rear support member 16A can be coupled to both the first portion 12A and the second portion 12B.

The rear support member 16A is provided in the shoulder portion of the upper frame 12, and the upper end portion 10B1 of the extension frame 10B is coupled to the rear support member 16A. Thus, the rear support member 16A is able to couple the extension frame 10B to the shoulder portion of the upper frame 12.

The rear support member 16A has a pair of semi-cylindrical upper edge portions 16A1. One upper edge portion 16A1 contacts the first portion 12A of the upper frame 12, and corresponds to an outer circumferential surface shape of the steel pipe of the first portion 12A. The other upper edge portion 16A1 contacts the extension frame 10B, and corresponds to the outer circumferential surface shape of the steel pipe of the extension frame 10B. Each of the upper edge portions 16A1 can contact the first portion 12A and the extension frame 10B, and can be welded to it. Thereby, the rear support member 16A can be coupled to the first portion 12A and the extension frame 10B.

The upper edge portions 16A1 has a semi-cylindrical shape that extends from the rear of the frames to the front so as to be able to contact the first portion 12A of the upper frame 12 and the extension frame 10B. In this way, the rear support member 16A can contact the first portion 12A and the extension frame 10B from both the front and the rear.

The front support member 16B is a steel pipe. Both end portions 16B1 of the front support member 16B have a crushed flat shape. The both end portions 16B1 contact the intermediate portion 10B3 of the extension frame 10B and the second portion 12B of the upper frame 12 from the front, and are welded thereto. In this way, the front support member 16B is coupled to the extension frame 10B and the upper frame 12.

The front support member 16B has a central portion having a steel pipe-shape. The central portion extends in the seat width direction. The central portion is perpendicular to the intermediate portion 10B3 of the extension frame 10B and the second portion 12B of the upper frame 12. The central portion is located in the front-back direction in substantially the same manner as the intermediate portion 10B3 and the second portion 12B. Both end portions 16B1 of the front support member 16B have a crushed and curved shape so as to correspond to the shapes of the front surfaces of the intermediate portion 10B3 and the second portion 12B. Thereby, both end portions 16B1 can contact the intermediate portion 10B3 and the second portion 12B and be welded thereto. Thereby, the front support member 16B is coupled to the intermediate portion 10B3 and the second portion 12B.

The front support member 16B is set to substantially the same height as the upper reinforcement plate 13. The upper reinforcement plate 13 is welded to the rear surface of both leg portions of the upper frame 12. The upper reinforcement plate 13 supports the main body frame 10A from the rear. The front support member 16B supports the extension frame 10B from the front. Thus, the main body frame 10A and the extension frame 10B are fixedly supported by each other, and thus are hard to deflect or twist in the front-back direction.

The rear support member 16A and the front support member 16B support and connect the extension frame 10B and the main body frame 10A from the front-back direction. Thus, the extension frame 10B is resistant to the input load from both sides of the front and back with respect to the main body frame 10A. For example, when the seat back 2 is stood up, the extension frame 10B can sufficiently resist forces that may be transmitted to the extension portion 2B from the front or the rear. When the seat back 2 is brought down forward, the extension frame 10B can sufficiently resist forces that may be transmitted to the back surface of the extension portion 2B from above.

The rear support member 16A and the front support member 16B are located at different positions. For that reason, the rear support member 16A can contact the upper edge portion 16A1 without interfering with the front support member 16B. The front support member 16B can be placed at the front-back position corresponding to the upper frame 12 and the extension frame 10B without interfering with the rear support member 16A. Thus, the thickness in the front-back direction of the seat back frame 10 can be reduced.

The rear support member 16A is provided at the high position in which the shoulder portion of the upper frame 12 and the upper end portion 10B1 of the extension frame 10B are connected to each other. The front support member 16B is provided at the low position in which the second portion 12B of the upper frame 12 and the intermediate portion 10B3 of the extension frame 10B are connected to each other. Thus, the load applied to the extension portion 2B from the seat front is transmitted to the seat back main body 2A by the front support member 16B at the low position compared to the rear support member 16A. Thus, the structural strength of the extension portion 2B can be effectively increased.

While the embodiments of invention have been described with reference to specific configurations, it will be apparent to those skilled in the art that many alternatives, modifications and variations may be made without departing from the scope of the present invention. Accordingly, embodiments of the present invention are intended to embrace all such alternatives, modifications and variations that may fall within the spirit and scope of the appended claims. For example, embodiments of the present invention should not be limited to the representative configurations, but may be modified, for example, as described below.

The seat back frame may be applied to the seat back of the driver's seat as described above, and may be applied to the seat backs of other seats. The seat back frame may be applied to the seats of the vehicle such as a car, and may be applied to, for example, vehicles such as a railway vehicle.

As described above, the extension portion can be located between the seats positioned adjacent to each other. The extension portion connects the seat backs of the seats so as to fill the space between the seat backs. Alternatively or additionally, the extension portion may support the back of the occupant sitting in front of the extension portion.

The extension frame and the main body frame (the upper frame) each may be the circular steel pipe as described above. Alternatively, the extension frame may be a steel pipe, a squared-off steel pipe or the like.

The rear support member and the front support member may be configured as described above and may have other structures. As described above, the rear support member and the front support member may be different members. Alternatively, both the rear support portion (member) and the front support portion (member) may be constructed as a single member.

The rear and front support members may be welded and coupled to the main body frame or the extension frame as described above. Alternatively, the rear and front support members may be coupled to the main body frame or the extension frame by a bolt, caulking or the like.

As described above, the rear and front support members may be set to heights different from each other. Alternatively, the rear and front support members may be set at the same height.

The rear support member may be located above the front support member as described above. Alternatively, the rear support member may be located below the front support member.

As described above, the main body frame of the seat back main body may be connected to the seat cushion so as to be capable of reclining. Alternatively, the main body frame may be fixed to the seat cushion. Alternatively, the main body frame may be fixed to a base member fixed on the floor. Alternatively, the main body frame may be fixed to a member fixed on the floor or may be attached to the member capable for reclining.

As described above, the main body frame of the seat back main body may be connected to the floor via the seat cushion 3. Alternatively, the main body frame may be directly connected to the floor (base).

As described above, the main body frame of the seat back main body is connected to a base. The base may be floor described above, a side panel, a roof panel, a vehicle member, a part of a vehicle body, or the like.

As described above, the seat back frame may comprise one rear support member and one front support member. Alternatively, the seat back frame may more than one rear support members and/or more than one front support members. All of the rear support members may be provided at a first height or first heights. All of the front support portions may be provided at a second height or second heights. All of the second heights may be different heights from all of the first height or first heights.

As described above, the upper reinforcement plate 13 and the front support member (portion) 16B may be the different members. Alternatively, the upper reinforcement plate 13 and the front support member (portion) 16B may be constructed by or formed of one member.

What is claimed is:

1. A seat back frame of a vehicle seat, the vehicle seat having a seat back main body configured to support a back of an occupant and an extension portion extending from a side of the seat back main body, the seat back frame comprising:
   a main body frame mounted on a base, the main body frame defining the seat back main body;

an extension frame that defines the extension portion; and a connection member for connecting the extension frame to a side of the main body frame, the connection member including:

a rear support portion contacting the main body frame and the extension frame from a rear side of the vehicle seat in order to couple the main body frame to the extension frame; and a front support portion contacting the main body frame and the extension frame from a front side of the vehicle seat in order to couple the main body frame to the extension frame, wherein the extension frame has a connection portion connected to the main body at one lateral side, an extending portion extending laterally from the connection portion in a cantilever manner, and a free lateral side opposite to the one lateral side.

2. The seat back frame of claim 1, wherein the rear and front support portions are different members.

3. The seat back frame of claim 1, wherein the rear and front support portions are provided at different heights from each other.

4. The seat back frame of claim 3, wherein the rear support portion is configured so as to connect an upper portion of the main body frame and an upper portion of the extension frame, and wherein the front support portion is configured so as to connect an intermediate portion of the main body frame and an intermediate portion of the extension frame.

5. The seat back frame of claim 1, wherein the rear support portion is one or more rear support portions and all of the one or more rear support portions are provided at a first height, and the front support portion is one or more front support portions and all of the one or more front support portions are provided at a second height, the second height being a different height from the first height.

6. The seat back frame of claim 1, wherein the rear support portion is a plate, and wherein the front support portion is a pipe.

7. The seat back frame of claim 1, wherein the main body frame comprises an upper frame and a reinforcement plate, wherein the upper frame comprises left and right leg portions extending vertically, wherein the reinforcement plate extends between the left and right leg portions, and wherein the reinforcement plate and the front support portion are provided at the same height.

8. The seat back frame of claim 7, wherein the reinforcement plate and the front support portion are one member.

* * * * *